United States Patent [19]

Liu

[11] 4,390,657

[45] Jun. 28, 1983

[54] COMPOSITION OF POLYCARBONATE, AN ABS RESIN AND AN ACRYLATE-METHACRYLATE INTERPOLYMER

[75] Inventor: Ping Y. Liu, Naperville, Ill.

[73] Assignee: General Electric Company, Mt. Vernon, Ind.

[21] Appl. No.: 312,795

[22] Filed: Oct. 19, 1981

[51] Int. Cl.$^3$ .............................................. C08L 69/00
[52] U.S. Cl. .................................. 524/504; 524/494; 524/847; 525/67; 525/71; 525/85; 525/148
[58] Field of Search .................. 525/67; 524/504, 494, 524/847

[56] References Cited

U.S. PATENT DOCUMENTS

| | | | |
|---|---|---|---|
| 3,130,177 | 4/1964 | Grabowski | 260/455 |
| 3,239,582 | 3/1966 | Keskkula et al. | 260/873 |
| 3,864,428 | 2/1975 | Nakamura et al. | 525/67 |
| 3,880,783 | 4/1975 | Serini et al. | 260/3 |
| 3,891,719 | 6/1975 | Schirmer et al. | 260/873 |
| 4,096,202 | 6/1978 | Farnham et al. | 525/64 |
| 4,299,928 | 11/1981 | Witman | 525/67 |

FOREIGN PATENT DOCUMENTS

| | | |
|---|---|---|
| 1109884 | 6/1961 | Fed. Rep. of Germany . |
| 2040958 | 9/1980 | United Kingdom ............ 525/64 |

*Primary Examiner*—Wilbert J. Briggs, Sr.
*Attorney, Agent, or Firm*—Martin B. Barancik; William F. Mufatti

[57] ABSTRACT

This application discloses novel thermoplastic molding compositions of a polycarbonate, a copolymer which comprises acrylonitrile-butadiene-alkenyl aromatic compound and a multiphase acrylic interpolymer.

29 Claims, No Drawings

COMPOSITION OF POLYCARBONATE, AN ABS RESIN AND AN ACRYLATE-METHACRYLATE INTERPOLYMER

BACKGROUND OF THE INVENTION

Polycarbonates are well known engineering thermoplastics that are useful for diverse applications which require high performance polymers. However, it is desirable to upgrade the impact strength of compositions containing these polymers, to improve the processability of compositions containing polymers and to improve the re-extrudability of compositions containing these polymers.

In U.S. Pat. No. 3,130,177, compositions that consist of a polycarbonate and an ABS copolymer are described. West German Pat. No. 1,109,884 describes compositions of a polycarbonate with styrene acrylonitrile-styrene resins. U.S. Pat. No. 3,880,783 describes transparent compositions of a particular group of polycarbonates that may include ABS polymers.

The present invention is based on the novel concept of combining a polycarbonate resin, a multiphase composite acrylic interpolymer which is based on a $C_{1-5}$ acrylate and a $C_{1-5}$ methacrylate and a copolymer which comprises acrylonitrile, butadiene and an alkenyl aromatic compound to form a thermoplastic molding composition having improved impact strength and ductility. In addition, these compositions have enhanced thermal aging properties and enhanced weld line strengths.

DETAILED DESCRIPTION OF THE INVENTION

The present invention provides thermoplastic molding compositions which comprise:
(a) a polycarbonate resin;
(b) a copolymer comprising acrylonitrile, butadiene and an alkenyl aromatic compound; and
(c) a multiphase composite interpolymer which comprises a $C_{1-5}$ acrylate and a $C_{1-5}$ methacrylate.

The polycarbonate resin may be of the formula:

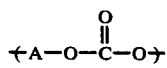

wherein A is a divalent aromatic radical of dihydric phenol. Preferred polycarbonate resins are of the formula:

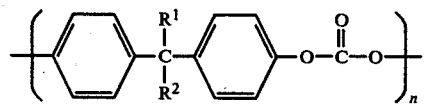

wherein $R^1$ and $R^2$ are hydrogen (lower) alkyl or phenyl and n is at least 30 or preferably between 40 and 300. The term (lower) alkyl includes hydrocarbon groups of from 1–6 carbon atoms.

High molecular weight, thermoplastic, aromatic polycarbonates in the sense of the present invention are to be understood as homopolycarbonates and copolycarbonates and mixtures thereof which have a number average molecular weights of about 8,000 to more than 200,000, preferably of about 10,000 to 80,000 and I.V. of 0.40 to 1.0 dl/g as measured by methylene chloride at 25° C. These polycarbonates are derived from dihydric phenols such as, for example, 2,2-bis(4-hydroxyphenyl)-propane, bis(4-hydroxyphenyl) methane, 2,2-bis(4-hydroxy-3-methylphenyl)propane, 4,4-bis(4-hydroxyphenyl)heptane, 2,2-(3,5,3'5'-tetrachloro-4,4'-dihydroxyphenyl)propane, 2,2-(3,4,3'5'-tetrabromo-4-4'-dihydroxydiphenyl)propane, and (3,3'-dichloro-4,4'-dihydroxyphenyl)methane. Other dihydric phenols which are also suitable for use in the preparation of the above polycarbonates are disclosed in U.S. Pat. Nos. 2,999,835; 3,028,365; 3,334,154 and 4,131,575.

These aromatic polycarbonates can be manufactured by known processes, such as, for example, by reacting a dihydric phenol with a carbonate precursor such as phosgene in accordance with methods set forth in the above-cited literature and U.S. Pat. Nos. 4,018,750 and 4,123,436, or by transesterification processes such as are disclosed in U.S. Pat. No. 3,153,008, as well as other processes known to those skilled in the art.

The aromatic polycarbonates utilized in the present invention also include the polymeric derivatives of a dihydric phenol, a dicarboxylic acid, and carbonic acid, such as disclosed in U.S. Pat. No. 3,169,121.

It is also possible to employ two or more different dihydric phenols or a copolymer of a dihydric phenol with a glycol or acid terminated polyester, or with a dibasic acid in the event a carbonate copolymer or interpolymer rather than a homopolymer is desired for use in the preparation of the aromatic polycarbonate utilized in the preparation of the aromatic polycarbonate utilized in the practice of this invention. Also employed in the practice of this invention can be blends of any of the above materials to provide the aromatic polycarbonate.

Branched polycarbonates, such as are described in U.S. Pat. No. 4,001,184, can be utilized in the practice of this invention, as can blends of a linear polycarbonate and a branched polycarbonate.

The multiphase composite interpolymer which comprises a $C_{1-5}$ acrylate and a $C_{1-5}$ methylacrylate are described in U.S. Pat. Nos. 4,096,202 and 4,260,693. These interpolymers consist of about 25 to 95 weight percent of a first elastomeric phase polymerized from a monomer system comprising about 75 to 99.8 percent by weight of a $C_{1-5}$ alkyl acrylate, 0.1 to 5 percent by weight crosslinking monomer, and 0.1 to 5 percent by weight of graftlinking monomer, and about 75 to 5 weight percent of a final rigid thermoplastic phase polymerized in the presence of said elastomeric phase.

The graftlinking monomer is a polyethylenically unsaturated monomer having a plurality of addition polymerizable reactive groups, at least one of which polymerizing at substantially different rate of polymerization from at least one other of said reactive groups. The function of the graftlinking monomer is to provide a residual level of unsaturation in the elastomeric phase, particularly in the latter stages of polymerization and, consequently, at or near the surface of the elastomer particles.

When the rigid thermoplastic phase is subsequently polymerized at the surface of the elastomer, the residual unsaturated addition polymerizable reactive group contributed by the graftlinking monomer participates in the subsequent reaction so that at least a portion of the rigid phase is chemically attached to surface of the elastomer. Among the effective graftlinking monomers are alkyl group-containing monomers of alkyl esters of ethylenically unsaturated acids such as allyl acrylate, allyl methacrylate, diallyl maleate, diallyl furmarate, diallyl itaconate, allyl acid maleate, allyl acid fumarate, and allyl acid itaconate. Somewhat less preferred are the diallyl esters of polycarboxylic acids which do not contain polymerizable unsaturation. The preferred graftlinking monomers are allyl methacrylate and diallyl maleate.

A most preferred interpolymer has only two stages, the first stage comprising about 60 to 95 percent by weight of the interpolymer and being polymerized from a monomer system comprising 95 to 99.8 percent by weight butyl acrylate, 0.1 to 2.5 percent by weight butylene diacrylate as crosslinking agent, 0.1 to 2.5 percent by weight allyl methacrylate or diallyl maleate as a graftlinking agent, with a final stage polymerized from about 60 to 100 percent by weight methacrylate.

The acrylonitrile-butadiene-alkenyl aromatic compound copolymers are well known. The preferred copolymers are made from acrylonitrile-butadiene-styrene and acrylonitrile-butadiene-alpha-methyl styrene. General methods for preparing these polymers are described in U.S. Pat. No. 4,107,232 and U.S. Pat. No. 3,130,177 which are incorporated by reference. The alkenyl aromatic compounds are described in U.S. Pat. No. 3,660,531 which is also incorporated by reference.

The weight percents of the acrylonitrile-butadiene-alkenyl aromatic compound copolymers are from 15–25:20–45:65–30 and preferably 15–20:30–40:55–40. Copolymers or blends containing copolymers derived from acrylonitrile-butadiene-alkenyl aromatic compound and an acrylic monomer may also be empolyed in the practice of the invention. The weight percents of these materials expressed as the ratio of the comonomers are from 1–25:20–50:30–50:15–25 of acrylonitrile:-butadiene:alkenyl aromatic compound:acrylic compound. These materials are commercially available or may be made using conventional procedures. An example of these materials is Blendex 436 which is available from Borg-Warner Corp. The preferred materials contain acrylonitrile-butadiene-styrene and methacrylic acid. In addition, certain of these materials may be prepared according to U.K. Pat. No. 939,484 or by the procedures described in the Encyclopedia of Polymer Science, Vol. 1, pp 436–444, Interscience (1964) or in U.S. Pat. No. 3,864,428 all of which are incorporated by reference.

Generally, the compositions of the invention will comprise from 50 to 95 parts by weight and more preferably from 90 to 95 parts by weight of a polycarbonate; and from 5 to 45 and more preferably from 5 to 10 parts by weight of a copolymer of an acrylonitrile-butadiene-alkenyl aromatic compound; and from 0.5 to 40 parts by weight and more preferably from 1 to 12 parts by weight of the multiphase interpolymer which comprises a $C_{1-5}$ acrylate and a $C_{1-5}$ methacrylate.

The compositions of the invention may include reinforcing fillers, such as aluminum, iron or nickel and the like and nonmetals, such as carbon filaments, silicates, such as acicular calcium silicate, acicular calcium sulfate, wollastonite, asbestos, titanium dioxide, bentonite, kaolinite potassium titanate and titanate whiskers, glass flakes and fibers and mixtures thereof. It is also to be understood that, unless the filler adds to the strength and stiffness of the composition, it is only a filler and not a reinforcing filler, as contemplated herein. In particular, the reinforcing fillers increase the flexural strength, the flexural modulus, the tensile strength and the heat distortion temperature.

Although it is only necessary to have at least a reinforcing amount of the reinforcement present, in general, the reinforcing filler may comprise from about 5 to about 60 parts by weight of the total composition.

In particular, the preferred reinforcing fillers are of glass, and it is preferred to use fibrous glass filaments comprised of lime-aluminum borosilicate glas that is relatively soda free. This is known as "E" glass. However, other glasses are useful where electrical properties are not so important, e.g., the low soda glass known as "C" glass. The filaments are made by standard processes, e.g., by stream or air blowing, flame blowing and mechanical pulling. The preferred filaments for reinforcement are made by mechanical pulling. The filament diameters range from about 0.003 to 0.009 inch, but this is not critical to the present invention.

By glass fibers, it is understood that glass silk, as well as all glass fiber materials derived therefrom including glass fiber fabrics, rovings, stable fibers and glass fiber mats are included. The length of the glass filaments and whether or not they are bundled into fibers and the fibers bundled in turn to yarns, ropes or rovings, or woven into mats, and the like, is also not critical to the invention. However, when using fibrous glass filaments, they may first be formed and gathered into a bundle known as a strand. In order to bind the filaments into a strand so that the strand can be handled, a binder or binding agent is applied to the glass filaments. Subsequently, the strand can be chopped into various lengths as desired. It is convenient to use the strands in lengths as desired. It is convenient to use the strands in lengths of from about $\frac{1}{8}''$ to about 1" long, preferably less than $\frac{1}{4}''$ in length. These are called chopped strands. Some of these binding agents are polymers such as polyvinyl acetate, particular polyester resins, polycarbonates, starch, acrylic melamine or polyvinyl alcohol. Preferably, the composition contains from about 1 to about 50 weight percent of the glass fibers.

Flame retardant amounts of retardants may also be utilized in the composition of the invention in amounts of from 0.5–50 parts by weight of the resinous components. Examples of suitable flame retardants may be found in U.S. Pat. Nos. 3,936,400 and 3,940,366 which are incorporated by reference. Other conventional non-reinforcing fillers, antioxidants, extrusion acids, light stabilizers and the like may be added to the composition of the invention if desired.

The manner of preparing the inventive composition is conventional. Preferably, each ingredient is added as part of a blend premix and the latter is mixed, e.g., by passage through an extruder, or by fluxing on a mill at a temperature dependent on the particular composition. The mixed composition may be cooled and cut up into molding granules and molded into the desired shape.

The term acrylic monomer is used to include $C_{1-5}$ acrylates and $C_{1-5}$ methylacrylate such as acrylic acid; ethyl acrylic acid, n-butyl acid, methyl acrylic acid and the like.

The term DG is used in the examples to report the weld line strength of samples prepared in a double gate mold which have been tested according to ASTM D-256. The superscripts for the impact data in the examples refer to the percent ductility of the samples.

DESCRIPTION OF THE PREFERRED EMBODIMENTS

The present invention is further illustrated in the following examples which are set forth as a further description of the invention.

EXAMPLE 1

A composition was prepared from 100 parts by weight of a polycarbonate of 2,2-bis(4-hydroxyphenyl) propane having an intrinsic viscosity of 0.46 dl/g as measured in methylene chloride at 25° C., 1 part by weight of a multi-phase composite interpolymer comprising a weight ratio of about 3 to 2 of n-butyl acrylate to methyl methacrylate with small amounts of graft-linking and cross-linking comonomers* and 3.2 parts by weight of an acrylonitrile-butadiene-styrene-methacrylate copolymer** by mechanically mixing the ingredients in a tumbler and thereafter extruding and pelletizing the composition. The pellets were injection molded and test specimens ¼"×½"×5" or ⅛"×½"×5" were prepared. The Izod impact values are reported in the Tables as foot lb./in. of notch. DG is in ft lbs.
*Acryloid KM 330
**Blendex 436 which has a ratio of acrylonitrile-butadiene-styrene-methacrylate of 2/46/33/19.

| Example | 125° C. 24 hr. aged ⅛" | ¼" notch no aging | DG no aging |
|---|---|---|---|
| A | 11.3[100] | 11.5[100] | 39.2[100] |

EXAMPLE 2

A composition was prepared using the same polycarbonate and the same composite interpolymer as used in Example 1 with various acrylonitrile-butadiene-styrene (ABS copolymers). The quantities of the ingredients are in parts by weight.

| EXAMPLE | POLY-CARBONATE | INTERPOLYMER | ABS* |
|---|---|---|---|
| B | 86 | 4 | 10 |
| C | 76 | 4 | 20 |
| D | 66 | 4 | 30 |
| E | 56 | 4 | 40 |
| F** | 65 | — | 35 |

*an acrylonitrile-butadiene-styrene (18/30/52)
**control

These compositions had the following impact strengths:

| EXAMPLE | ¼" NOTCHED IMPACT | DG | MFI g/10'* |
|---|---|---|---|
| B | 15.3[100] | 3.6° | 13.8 |
| C | 14.0[100] | 2.6° | 13.7 |
| D | 13.4[100] | 2.4° | 14.8 |
| E | 12.8[100] | 2.3° | 15.0 |
| F | 7.3[100] | 0.8° | — |

*ASTM D 1238—condition 0 at 300° C.

EXAMPLE 3

Compositions containing 86 parts by weight of the polycarbonate of Example 1, 4 parts by weight of the composite interpolymer of Example 1 and 10 parts per weight of ABS polymers were prepared:

| EXAMPLE | ACRYLONITRILE/ BUTADIENE/ STYRENE | IMPACT STRENGTH ⅛" | IMPACT STRENGTH ¼" | DG | MFI g/10' |
|---|---|---|---|---|---|
| G | 22/23/55* (wt. %) | 11.3 | 8.5 | 28.9 | 24 |
| H | 17/38/45** (wt. %) | 10.6 | 8.2 | 31.5 | 27 |
| I | 25/40/35*** (wt. %) | 11.3 | 9.0 | 31.8 | 24 |

*Kralastic K 2938
**Kralastic K 2540
***Kralastic K 3462

COMPARATIVE EXAMPLE

A composition containing 76 parts by weight of the polycarbonate of Example 1, 4 parts by weight of the composite interpolymer of Example 1 and 20 parts by weight ABS polymer, identified as Example K was compared with Example L which is 80 parts by weight of the polycarbonate of Example 1 and 20 parts by weight of ABS polymer.

| EXAMPLE | ACRYLONITRILE/ BUTADIENE/ STYRENE | IMPACT STRENGTH ⅛" | IMPACT STRENGTH ¼" | DG | MFI g/10' |
|---|---|---|---|---|---|
| K | 17/38/45* (wt. %) | 9.9 | 6.8[40] | 3.7° | 23.5 |
| L** | 17/38/45* (wt. %) | 4.1[40] | 4.7[20] | 3.0° | 23.6 |

*Kralastic K 2540
**Control

EXAMPLE 4

Two compositions were prepared which contained 70.2 parts by weight of a polycarbonate of 2,2-bis4-hydroxyphenyl)propane having an I.V. of about 0.57 dl/g as measured in methylene chloride at 25° C.; 20 parts by weight of a polycarbonate copolymer of tetrabromobisphenol-A and 2,2-bis(4-hydroxyphenyl) propane having an I.V. of about 0.33 dl/g as measured in methylene chloride at 25° C.; 5 parts by weight of a copolymer of acrylonitrile-butadiene-styrene; 4 parts by weight of the composite interpolymer of Example 1; 0.5 parts by weight of sodium, 2,4,5-trichlorobenzene sulfonate, and 0.3 parts by weight of polytetrafluoroethylene* using the same procedure that was employed in Example 1.
*Teflon 30 which is a 27% aqueous dispersion of polytetrafluoethylene from which the water is evaporated prior to compounding.

| | M** | N*** |
|---|---|---|
| Yield, TN, kpsi | 8.6 | 8.3 |
| Break, TN, kpsi | 8.2 | 7.9 |
| Elongation, TN, % | 53.0 | 56.0 |
| Yield, FX. kpsi | 13.0 | 12.6 |
| Mod. FX, kpsi | 341.8 | 335.0 |
| DTUL, °F. at 264 psi | 269.0 | 275.0 |
| Impact Strength, ft-lb/in. | | |
| ⅛" NI unaged | 13.9 | 12.6 |
| ⅛" NI 125° C./24 hrs. aged | 11.8 | 11.2 |
| ¼" NI | 9.2 | 8.2 |
| Double Gate, ft-lb | 15.1[60] | 22.4 |
| MFI g/10' | 7.2 | 9.5 |

**ABS copolymer was Kralastic K2938
***ABS copolymer was Kralastic K2540
Sample M had a double gate ductility of 60% while all other impact strengths that were measured were 100% ductile.

Samples of M and N were tested under UL Bulletin 94 procedure and found to be $V_o$ at 1/16 inch.

Obviously, other modifications and variations of the present invention are possible in the light of the above teachings. It is, therefore, to be understood that changes may be made in the particular embodiment of the invention described which are within the full intended scope of the invention as defined by the appended claims.

What is claimed is:

1. A thermoplastic molding composition which comprises:
   (a) a polycarbonate resin;
   (b) a copolymer which comprises acrylonitrile, butadiene and an alkenyl aromatic compound; and
   (c) a multiphase composite interpolymer which comprises a $C_1$–$C_5$ acrylate and a $C_1$–$C_5$ methacrylate.

2. A thermoplastic molding composition as defined in claim 1 wherein component (b) is a copolymer of acrylonitrile, butadiene and styrene.

3. A thermoplastic molding composition as defined in claim 2 wherein the polycarbonate resin is of the formula:

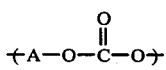

wherein A is a divalent aromatic radical of a dihydric phenol.

4. A thermoplastic molding composition as defined in claim 3 wherein the polycarbonate resin is of the formula:

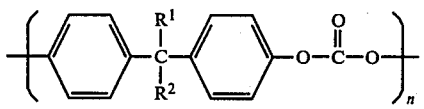

wherein $R^1$ and $R^2$ are hydrogen, (lower) alkyl or phenyl and n is at least 30.

5. A thermoplastic molding composition as defined in claim 4 wherein in the multiphase composite interpolymer, the methacrylate is selected from the group consisting of methyl methacrylate, 1,3-butylene dimethacrylate, isobutyl methacrylate, butyl methacrylate and ethyl methacrylate and the acrylate is selected from the group consisting of 1,4-butanediol diacrylate, isobutyl acrylate, methyl acrylate, ethyl acrylate, n-butyl acrylate and 1,3-butylene diacrylate.

6. A thermoplastic molding composition as defined in claim 5 wherein the polycarbonate resin is derived from 2,2-bis-(4-hydroxyphenyl)propane.

7. A thermoplastic molding composition as defined in claim 6 wherein the interpolymer comprises methyl methacrylate and n-butyl acrylate.

8. A thermoplastic molding composition as defined in claim 1 wherein component (b) is a copolymer of acrylonitrile, butadiene and methyl styrene.

9. A thermoplastic molding composition as defined in claim 8 wherein the polycarbonate is of the formula:

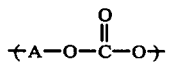

wherein A is a divalent aromatic radical of a dihydric phenol.

10. A thermoplastic molding composition as defined in claim 9 wherein the polycarbonate resin is of the formula:

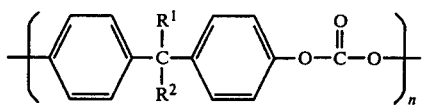

wherein $R^1$ and $R^2$ are hydrogen, (lower) alkyl of phenyl and n is at least 30.

11. A thermoplastic molding composition as defined in claim 10 wherein in the multiphase composite interpolymer, the methacrylate is selected from the group consisting of methyl methacrylate, 1,3-butylene dimethacrylate, isobutyl methacrylate, butyl methacrylate and ethyl methacrylate and the acrylate is selected from the group consisting of 1,4-butanediol diacrylate, isobutyl acrylate, methyl acrylate, ethyl acrylate, n-butyl acrylate and 1,3-butylene diacrylate.

12. A thermoplastic molding composition as defined in claim 11 wherein the polycarbonate resin is derived from 2,2-bis(4-hydroxyphenyl)propane.

13. A thermoplastic molding composition as defined in claim 12 wherein the multiphase composite interpolymer is derived from methyl methacrylate and n-butyl acrylate.

14. A thermoplastic molding composition as defined in claim 1 which includes a reinforcing amount of a reinforcing filler.

15. A thermoplastic molding composition as defined in claim 14 wherein the reinforcing filler is filamentous glass.

16. A thermoplastic molding composition as defined in claim 1 which includes a flame retardant amount of a flame retardant agent.

17. A thermoplastic molding composition as defined in claim 1 wherein component (b) is a copolymer of acrylonitrile-butadiene-styrene-methacrylate.

18. A thermoplastic molding composition as defined in claim 17 wherein the polycarbonate is of the formula:

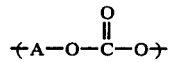

wherein A is a divalent aromatic radical of a dihydric phenol.

19. A thermoplastic molding composition as defined in claim 18 wherein the polycarbonate resin is of the formula:

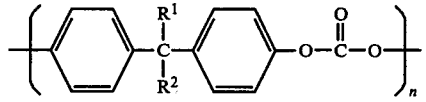

wherein $R^1$ and $R^2$ are hydrogen, (lower) alkyl or phenyl and n is at least 30.

20. A thermoplastic molding composition as defined in claim 19 wherein in the multiphase composite interpolymer, the methacrylate is selected from the group consisting of methyl methacrylate, 1,3-butylene dimethacrylate, isobutyl methacrylate, butyl methacrylate and ethyl methacrylate and the acrylate is selected from the group consisting of 1,4-butandiol diacrylate, isobutyl acrylate, methyl acrylate, ethyl acrylate, n-butyl acrylate and 1,3-butylene diacrylate.

21. A thermoplastic molding composition as defined in claim 20 wherein the polycarbonate resin is derived from 2,2-bis(4-hydroxyphenyl)propane.

22. A thermoplastic molding composition as defined in claim 17 which includes a reinforcing amount of a reinforcing filler.

23. A thermoplastic molding composition as defined in claim 22 wherein the reinforcing filler is filamentous glass.

24. A thermoplastic molding composition as defined in claim 17 which includes a flame retardant amount of a flame retardant agent.

25. A thermoplastic molding composition which comprises:
(a) a polycarbonate resin;
(b) a copolymer which comprises acrylonitrile, butadiene, an alkenyl aromatic compound and a second acrylic monomer; and
(c) a multiphase composite interpolymer which comprises a $C_1-C_5$ acrylate and a $C_1-C_5$ methacrylate.

26. A thermoplastic molding composition as defined in claim 25 wherein component (b) is a polymer of acrylonitrile butadiene, styrene and methacrylic acid.

27. A thermoplastic molding composition as defined in claim 26 wherein the weight percents of the comonomers in component (b) are from 1-25:20-50:30-50:15-25 of acrylonitrile:butadiene:styrene:methacrylic acid.

28. A thermoplastic molding composition which comprises:
(a) from 50 to 95 parts by weight of a polycarbonate resin;
(b) from 5 to 45 parts by weight of a copolymer which comprises acrylonitrile, butadiene and an alkenyl aromatic compound; and
(c) from 0.5 to 40 parts by weight of a multiphase composite interpolymer which comprises a $C_1-C_5$ acrylate and a $C_1-C_5$ methacrylate.

29. A thermoplastic molding composition which comprises:
(a) from 90 to 95 parts by weight of a polycarbonate resin;
(b) from 5 to 10 parts by weight of a copolymer which comprises acrylonitrile, butadiene and an alkenyl aromatic compound; and
(c) from 1 to 12 parts by weight of a multiphase composite interpolymer which comprises a $C_1-C_5$ acrylate and a $C_1-C_5$ methacrylate.

* * * * *